United States Patent Office 3,127,396
Patented Mar. 31, 1964

3,127,396
PRODUCTION OF 1,2-METHYLENE AND 16,17-METHYLENE KETOSTEROIDS
Rudolf Wiechert, Berlin-Lichterfelde, Emanuel Kaspar, Berlin-Wilmersdorf, and Martin Schenck, Berlin-Frohnau, Germany, assignors to Schering A.G., Berlin, Germany
No Drawing. Filed Oct. 6, 1960, Ser. No. 60,812
Claims priority, application Germany Oct. 25, 1958
22 Claims. (Cl. 260—239.5)

The present invention relates to the production of 1,2-methylene ketosteroids and 16,17-methylene ketosteroids and more particularly to the production of 1,2-methylene and 1,2-diazomethylene derivatives of 3-ketosteroids and to simple methods of producting 16,17-methylene-20-ketosteroids.

It is an object of the present invention to provide new 3-ketosteroid derivatives, and more particularly 1,2-methylene - 3-ketosteroids and 1,2-diazomethylene-3-ketosteroids which are useful as intermediate products in the synthesis of valuable compounds of the steroid series, and which are also themselves useful in having a marked progesterone-like action.

It is another object of the present invention to provide a method of producing the 3-ketosteroid derivatives.

It is still another object of the present invention to provide a simple method of producing 16,17-methylene-20-ketosteroids.

This application is a continuation-in-part of our co-pending application Serial No. 847,106, filed October 19, 1959, now abandoned, for "3-Ketosteroid Derivatives."

Other objects and advantages of the present invention will be apparent from a further reading of the specification and of the appended claims.

With the above objects in view, the present invention mainly comprises a compound of the following formula:

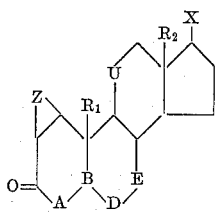

wherein $R_1$ is selected from the group consisting of hydrogen and methyl, wherein $R_2$ is selected from the group consisting of hydrogen and methyl, wherein U is selected from the group consisting of —$CH_2$—, —CHOH, —CHOacyl and —CO wherein acyl is derived from a lower aliphatic carboxylic acid, wherein X is selected from the group consisting of

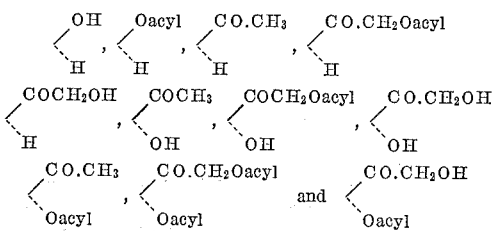

wherein acyl is derived from a lower aliphatic carboxylic acid, wherein Z is selected from the group consisting of —$CH_2$— and —$CH_2$—N=N—, and wherein

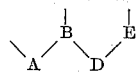

is selected from the group consisting of

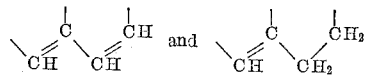

It has been found that when diazomethane is reacted with a $\Delta^{1,4,6}$-3-ketosteroid, the diazomethane is a smooth reaction adds on the $\Delta^1$-double bond of the ketosteroid. The reaction may be illustrated by the following equation:

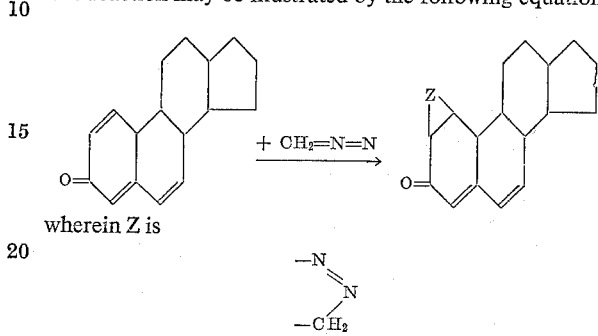

wherein Z is $$-N\diagdown_{N}$$
$$-CH_2$$

This type of reaction could not possibly be predicted because it is impossible to predict in what manner the individual double bonds will behave with respect to diazomethane. We have, in fact, found that $\Delta^{1,4}$-3-ketosteroids are inert to diazomethane.

The thus obtained 1,2-diazomethylene-$\Delta^{4,6}$-3-ketosteroids are themselves extremely valuable intermediate products in the synthesis of active steroids.

In accordance with the present invention, the thus obtained 1,2-diazobethylene-$\Delta^{4,6}$-3-ketosteroid is further treated so as to split off nitrogen therefrom, resulting in the formation of the corresponding 1,2-methylene-$\Delta^{4,6}$-3-ketosteroid. The $\Delta^6$-double bond of this ketosteroid may then be subjected to selective hydrogenation so as to saturate the same, thereby resulting in the formation of the corresponding 1,2-methylene-$\Delta^4$-3-ketosteroid. Both the 1,2-methylene-$\Delta^{4,6}$-3-ketosteroids and the 1,2-methylene $\Delta^4$-3-ketosteroids which are produced in accordance with the present invention have highly effective steroid activity, which while being of the same type of activity as the original compound from which they are formed, is however, such marked activity as to constitute an important advance in the field of steroid chemistry. Thus, for example, 1,2-methylene-$\Delta^{4,6}$-pregnadiene-3,20-dione and 1,2-methylene-$\Delta^4$-pregnadiene-3,20-dione have a strong progesterone-like activity.

The reaction between the $\Delta^{1,4,6}$-3-ketosteroid and the diazomethane should be carried out in solution, that is in a solvent for both the steroid and the gaseous diazomethane. Any suitable solvent may be used for this purpose. The most suitable solvents are ether and lower halogenated hydrocarbons, such as methylene. The reaction should be carried out at low temperatures, e.g. 0–30° C., with the diazomethane being added in excess. The reaction mixture is allowed to stand for several days to complete the reaction.

The splitting off of the nitrogen from the 1,2-diazomethylene compound to form the corresponding 1,2-methylene compound may be accomplished either by subjecting the 1,2-diazomethylene compound to a thermal treatment or by treating the 1,2-diazomethylene compound with an acid catalyst.

The thermal splitting of the 1,2-diazomethylene compound causes the development of nitrogen which may be followed to observe the course of the reaction. The thermal splitting is preferably carried out under relatively high vacuum and the development of nitrogen may be noted by the decrease in the vacuum. The end of the reaction, that is, the termination of the nitrogen development, may be observed by noting a constant pressure in the vacuum chamber. The development of the nitrogen generally being at approximately the melting point of the diazomethylene compound.

It is actually quite surprising that the thermal splitting of the 1,2-diazomethylene compound in accordance with the present invention proceeds to form the corresponding 1,2-methylene-$\Delta^{4,6}$-3-ketosteroid rather than the 1-methyl-$\Delta^{1,4,6}$-3-ketosteroid which would be expected. Thus, the splitting off of nitrogen according to the present invention proceeds in accordance with the following equation:

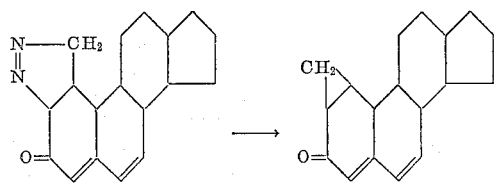

As indicated above, the $\Delta^6$-double bond of the thus obtained 1,2-methylene compound, that is, the $\Delta^{6,7}$-double bond, can be selectively hydrogenated. Thus, in this manner the corresponding 1,2-methylene-$\Delta^4$-3-ketosteroid can be produced, this compound not being produceable from the $\Delta^{1,4}$-3-ketosteroid or the theoretical diazomethane addition product thereof because such diazomethane addition product cannot be produced in direct manner, as mentioned above.

The hydrogenation of $\Delta^6$-double bond can be carried out by means of a palladium catalyst on a carrier, this reaction generally being carried out under normal pressure and room temperature. The reaction may be carried out in solution using a solvent such as an alkaline alcohol, or dioxane or tetrahydrofurane. It is also possible to use palladium on strontium carbonate in methanol or benzene.

The hydrogenation proceeds in accordance with the following equation:

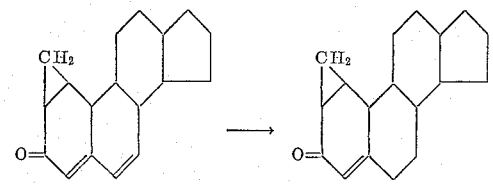

It should be noted that the above equations are only for the purpose of schematically illustrating the process of the present invention, and the scope of the invention should of course not be limited to the specific details of the equations. Thus, various different $\Delta^{1,4,6}$-3-ketosteroids can be used as starting materials, as illustrated in the examples of this case, which contain various different substituents in different portions of the molecule, particularly in the 17-position.

Thus, the starting material utilized for the purposes of the present invention may be any compound falling within the following general formula:

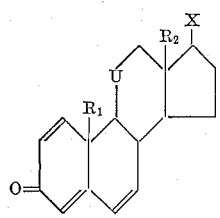

wherein $R_1$, $R_2$, U, and X have the same definitions as above.

According to a preferred embodiment of the present invention, the 1,2-diazomethylene-$\Delta^{4,6}$-3-ketosteroid which is produced by the reaction of diazomethane and the corresponding $\Delta^{1,4,6}$-3-ketosteroid, is treated with an acid catalyst to split off nitrogen and produce the corresponding 1,2-methylene-$\Delta^{4,6}$-3-ketosteroid.

Although the 1,2-diazomethylene compound can be converted to the 1,2-methylene compound by thermal treatment, as mentioned above, this process has the disadvantage that very good yields can be obtained only with specific diazomethylene-3-ketosteroids while with other diazomethylene-3-ketosteroids, the yields which are obtained are not suitable for commercial, technical purposes. Thus, the presence of a thermally sensitive group on the molecule such as the oxyketone or the dioxyacetone side chain, results in a considerable lowering of the yields obtained by the thermal treatment mentioned above.

It has, however, been found that the 1,2-diazomethylene-$\Delta^{4,6}$-3-ketosteroids (which may actually better be named as ($\Delta^{1'}$-pyrazolino)-4',3':1,2-$\Delta^{4,6}$-3-ketosteroids can be treated with an acid catalyst to split off the nitrogen therefrom and form the corresponding 1,2-methylene-$\Delta^{4,6}$-3-ketosteroids. This reaction with the acid catalyst such as perchloric acid, concentrated hydrochloric acid, trifluoroacetic acid, boron trifluoride and fluoride and fluoroboric acid is most conveniently carried out at room temperature. The reaction may be carried out over a wide range of temperatures, preferably at a temperature between 0–50° C.

It has been found that this method of splitting off the nitrogen from the 1,2-diazomethylene-$\Delta^{4,6}$-3-ketosteroid due to the carrying out of the reaction at low reaction temperatures not only increases the yield of the corresponding 1,2-methylene-$\Delta^{4,6}$-3-ketosteroids, but also the obtained 1,2-methylene-$\Delta^{4,6}$-3-ketosteroid is produced in technically suitable manner even if the compound contains such thermolabile groups of the type mentioned above.

Obviously, the 1,2-methylene-$\Delta^{4,6}$-3-ketosteroids which are produced in this manner can be subjected to a partial hydrogenation of the $\Delta^6$-double bond thereof in the same manner as in the case of 1,2-methylene-$\Delta^{4,6}$-3-ketosteroids produced by thermal splitting off of the nitrogen from the corresponding 1,2-diazomethylene compound.

It has surprisingly been found that the above set forth method of splitting off nitrogen from 1,2-diazomethylene-$\Delta^{4,6}$-3-ketosteroids by means of an acid catalyst such as perchloric acid is also applicable to the conversion of the analogous 16,17-diazomethylene-20-ketosteroids to the corresponding 16,17-methylene-20-ketosteroids.

Thus, the present invention also comprises a method of producing a compound of the following formula:

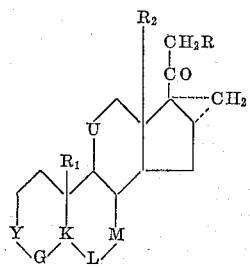

wherein R is selected from the group consisting of hydrogen, hydroxyl and Oacyl wherein acyl is derived from a lower aliphatic carboxylic acid, wherein $R_1$ is selected from the group consisting of hydrogen and methyl, wherein $R_2$ is selected from the group consisting of hydrogen and methyl, wherein U is selected from the group consisting of —$CH_2$, —CHOH, —CHOacyl and —CO wherein acyl is derived from a lower aliphatic carboxylic acid, wherein Y is selected from the group consisting of —$CH_2$—, —CHOH, —CO and —CHOacyl wherein acyl is derived from a lower aliphatic carboxylic acid, and wherein

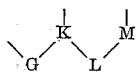

is selected from the group consisting of

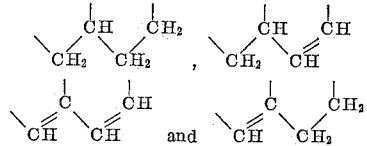

the step of treating 16,17-diazomethylene-20-ketosteroid of the following general formula:

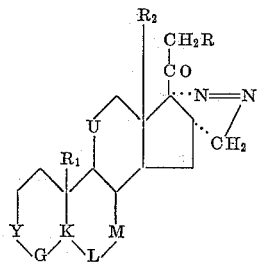

wherein R, $R_1$, $R_2$, U, Y and —G—K—L—M have the same definitions as above with an acid catalyst so as to split-off the nitrogen therefrom, thereby forming the corresponding 1,2-methylene-20-ketosteroid.

This method may be illustrated by the following equation:

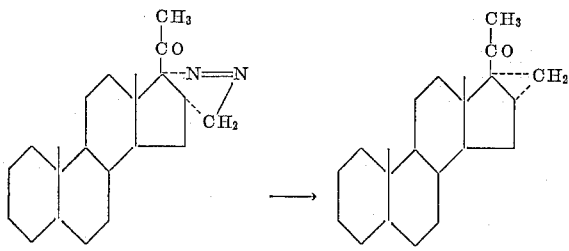

It has been found that if it is attempted to form a 16,17-methylene-20-ketosteroid from the corresponding 16,17-diazomethylene-20-ketosteroid by pyrolysis the main product which is formed is the $\Delta^{16}$-unsaturated-16-methyl steroid with the 16,17-methylene-20-ketosteroid only being being formed in minimum yield as a side product.

The method of the present invention, on the other hand, of treating a 16,17-diazomethylene-20-ketosteroid with an acid catalyst such as perchloric acid, concentrated hydrochloric acid, trifluoroacetic acid, boron trifluoride, boron trifluoride etherate or fluoboric acid, preferably at a temperature —0–50° C., and most preferably at about room temperature, results in the production of the desired 16,17-methylene-20-ketosteroid in a simple manner in high yield.

The following examples are given to illustrate the present invention. The scope of the invention is not, however, meant to be limited to the specific details of the examples.

Example I (a) *1,2 - diazomethylene - $\Delta^{4,6}$ - androstadiene - 17β-ol-3-one-17-acetate.*—5.7 g. of nitrosomethyl urea are reacted with 17.2 cc. of 40% potassium hydroxide at a temperature of —5° C. under 100 cc. of ether. The etherial phase is added to 1 g. of $\Delta^{1,4,6}$-androstatriene-17β-ol-3-one-17-acetate and the solution is allowed to stand in a closed container for 6 days at room temperature.

Precipitated polymers are then filtered off from the reaction solution and the ether is evaporated off at room temperature under vacuum. After chromatography on silica gel, there is obtained 1,2-diazomethylene-$\Delta^{4,6}$-androstadiene-17β-ol-3 - one - 17 - acetate. M.P.=154–158° C. U.V.:$\epsilon_{290}$=23,700.

(b) *1,2 - methylene - $\Delta^{4,6}$ - androstadiene - 17β - ol - 3-one-17-acetate.*—200 mg. of the above obtained diazomethylene compound are heated under high vacuum at a temperature of 140° C. The substances starts to melt and the pressure in the apparatus increases from $10^{-3}$ mm. to $5 \times^{-2}$ mm. After 10 minutes the reaction is completed. The resulting compound is recrystallized from isopropyl ether. M.P.=174–176° C. U.V.:$\epsilon_{282}$=20,540.

(c) *1,2 - methylene - $\Delta^4$ - androstene - 17β - ol - 3 - one-17-acetate.*—322 mg. of 1,2-methylene-$\Delta^{4,6}$-androstadiene-17β-ol-3-one-17-acetate are hydrogenated in 9 cc. of water-free methanol which contains 0.1% of potassium hydroxide, under the addition of 160 mg. of 10% palladium-carbon catalyst until 1 millimol of hydrogen is taken up. The catalyst is then filtered off, the residue is evaporated to dryness and the compound is recrystallized from isopropyl ether. M.P.=174–175° C. U.V.:$\epsilon_{239}$=14,000.

Example II (a) *1,2 - diazomethylen - $\Delta^{4,6}$ - pregnadiene - 17β - ol-3,20 - dione -17 acetate.*—The production of the above compound proceeds starting from $\Delta^{1,4,6}$-pregnatriene-17β-ol-3,20-dione-17-acetate as in the above described conversion of $\Delta^{1,4,6}$-androstatriene-17β-ol-3-one-17-acetate. M.P.=183–185° C. U.V.:$\epsilon_{288}$=22,400.

(b) *1,2 - methylene - $\Delta^{4,6}$ - pregnadiene - 17β - ol - 3,20-dione-17-acetate.* The 1,2-diazomethylene compound which is produced according to (a) above is heated under vacuum at 180° C., as in the case 1,2-diazomethylene-$\Delta^{4,6}$-anrostadiene-17β-ol-3-one-17-acetate, to obtain the 1,2-methylene-$\Delta^{4,6}$-pregnadiene-17β-ol - 3,20 - dione - 17-acetate. This compound is recrystallized from methanol. M.P.=279.5–280.5° C. U.V.:$\epsilon_{282}$=20,790.

Example III (a) 18.6 g. of $\Delta^{1,4,6}$-pregnatriene-17α-21-diol-3,20-dione-21-acetate are dissolved in 560 cc. of methylene chloride and an ethereal solution of diazomethane (1.8 liters produced from 107 g. of nitrosomethyl urea) are added thereto. This reaction mixture is allowed to stand for 1 week, it is then evaporated under vacuum, and the residue subjected to chromatography over silica gel (+10% $H_2O$). By means of chloroform, there is obtained the ($\Delta^{1'}$-pyrazolino)-4',3':1,2 - $\Delta^{4,6}$ - pregnadiene - 17α - 21-diol-3,20-dione-21-acetate, which is recrystallized from methanol. This compound has a melting point with decomposition of 229–230° C. $[\alpha]_D^{27}$+24° ($CHCl_3$); U.V.$\epsilon_{204}$=4440; $\epsilon_{232}$=3980; $\epsilon_{293}$=25,480.

(b) 300 mg. of ($\Delta^1$-pyrazolino)-4',3':1,2-$\Delta^{4,6}$-pregnadiene-17α-21-diol-3,20-dione-21-acetate are added in small portions to 6 cc. of dioxane which contains 0.1 cc. of 70% perchloric acid, resulting in a vigorous development of gas. The reaction product is subsequently poured into ice water, the resulting precipitate is filtered off under suction and subjected to chromatography over silica gel (+10% $H_2O$). By means of chloroform, there is obtained 1,2-methylene-$\Delta^{4,6}$-pregnadiene-17α,21-diol-3,20-dione-21-acetate which is recrystallized from acetic ester. The compound has a melting point of 204–206° C. U.V. $\epsilon_{207}$=6700; $\epsilon_{281}$=19,400.

(c) 1.99 g. of 1,2-methylene-$\Delta^{4,6}$-pregnadiene-17α-21-diol-3,20-dione-21 acetate and 560 mg. of dry potassium acetate are added to 240 cc. of dry methanol, which has been previously boiled under dry, oxygen-free nitrogen, and under this nitrogen the reaction mixture is refluxed for three hours. After cooling, the reaction solution is concentrated under vacuum at a temperature of about 25° C. to about one-third the initial volume, mixed with several times its volume of water, and shaken several times with methylene chloide. The purified methylene chloride solution is then thoroughly washed with water, dried over sodium sulfate, and evaporated to dryness at about 25° C. under vacuum. After rubbing the pentane there is obtained 1,2-methylene-$\Delta^{4,6}$-pregnadiene-17$\alpha$,21-diol-3,20-dione. U.V. $\epsilon_{207}=6300$; $\epsilon_{281}=19,100$.

Example IV 500 mg. of ($\Delta^{1'}$-pyrazolino)-4',3':1,2 - $\Delta^{4,6}$ - androstadiene-17$\beta$-ol-3-one-17-acetate (having a melting point of 157–158° C.) are added in portions to a solution of 20 cc. of acetone and 0.2 cc. of 70% perchloric acid under stirring at room temperature. This results in a vigorous development of gas. After the completion of the reaction (about 2 minutes) the reaction mixture is stirred into ice water. The solution is extracted with methylene chloride and a methylene chloride phase is washed with water until neutral. It is then dried with sodium sulfate and evaporated to dryness under vacuum. The compound 1,2-methylene-$\Delta^{4,6}$-androstadiene-17$\beta$-ol-3-one-17 - acetate is recrystallized from isopropyl ether and has a melting point of 178–180° C. U.V. $\epsilon_{282}=20,500$.

Example V 500 mg. of ($\Delta^{1'}$-pyrazolino)-4',3':1,2-$\Delta^{4,6}$-pregnadiene-17$\alpha$-ol-3,20-dione-17-acetate (having a melting point of 183–185° C.) are added in portions to 20 cc. of methylene chloride which contains 0.2 cc. of perchloric acid, the addition being at room temperature. Before the working up then proceeds as in Example VI. From methanol there is obtained 1,2-methylene-$\Delta^{4,6}$-pregnadiene-17$\alpha$-ol-3,20-dione-17-acetate having a melting point of 279.5–280.5° C. U.V $\epsilon_{282}=20,790$.

Example VI 5.7 g. of $\Delta^{1,4,6}$-pregnatriene-11$\beta$,17$\alpha$,21-triol-3,20-dione-21-acetate are dissolved in 120 cc. of methylene chloride and 270 cc. of ether. Into this solution is distilled the diazomethane obtained from 68 g. of nitrosomethyl urea by decomposition with 200 cc. of 40% potassium hydroxide solution in 1200 cc. of ether. After standing for seven days at room temperature, the solution is concentrated under vacuum to dryness at the same temperature. The obtained crude product is subjected to chromatography over silica gel ($+10\%$ $H_2O$). By elution with acetic ester and recrystallization from methanol, there is obtained ($\Delta^{1'}$-pyrazolino)-4',3':1,2-$\Delta^{4,6}$-pregnadiene-11$\beta$,17$\alpha$,21-triol-3,20-dione-21 acetate having a melting point with decomposition of 153–154° C. U.V. $\epsilon_{294}=22,400$; $\epsilon_{232}=3500$; $\epsilon_{203}=3800$.

500 mg. of ($\Delta^{1'}$-pyrazolino)-4',3':1,2-$\Delta^{4,6}$-pregnadiene-11$\beta$,17$\alpha$,21-triol-3,20-dione-21-acetate are added in portions at room temperature to a solution of 0.2 cc. of perchloric acid in 20 cc. of acetone. The acetone is then evaporated under vacuum and the residue is taken up with methylene chloride. This solution is washed with water until neutral, dried over sodium sulfate, and then evaporated to dryness. The residue consists of 1,2-methylene-$\Delta^{4,6}$-pregnadiene-11$\beta$,17$\alpha$,21-triol - 3,20 - dione - 21-acetate. U.V. $\epsilon_{282}=20,100$.

Example VII 1.0 g. of ($\Delta^{1'}$-pyrazolino)-4',3':16,17-($\Delta^5$-pregnene-3$\beta$-ol-20-one-acetate) produced by the addition of diazomethane onto $\Delta^{5,16}$-pregnadiene-3$\beta$-ol-20-on-acetate are added in portions into a solution of 20 cc. of dioxane which contains 0.4 cc. of 70% perchloric acid. This results in a strong generation of gas. After a half hour the solution is poured into ice water and after a sufficient time the precipitated product is filtered off under suction. After recrystallization from ethyl acetate there is obtained 350 mg. of 16,17-methylene-$\Delta^5$-pregnene-3$\beta$-ol-20-one-acetate having a melting point of 188–191° C. Repeated recrystallization gives a melting point of 190–192° C. U.V.: $\epsilon_{208}=5100$.

The substance is found to be identical with the authentic material.

Example VIII 1.0 g. of ($\Delta^{1'}$-pyrazolino)-4',3':16,17-($\Delta^5$-pregnene-3$\beta$-ol-20-one-acetate) are added in portions to a solution of 20 cc. of acetone which contains 0.5 cc. of approximately 50% fluoboric acid. This results in a strong development of gas. After a half hour the reaction product is further worked up as in Example VII. After recrystallization from ethyl acetate there is obtained the 16,17-methylene-pregnenolone-acetate having a melting point of 187–190° C. U.V.: $\epsilon_{208}=4900$.

Example IX 1.0 g. of ($\Delta^{1'}$-pyrazolino)-4',3':16,17-($\Delta^5$-pregnene-3$\beta$-ol-20-one-acetate) are added in portions to a solution of 15 cc. methylene chloride which contains 0.7 cc. of borin trifluoride etherate. This results in the development of gas. After ¾ hour the reaction product is further worked up as in Example VII. After recrystallization from ethyl acetate there is obtained 16,17-methylene-pregneneolone-3-acetate having a melting point of 187–190° C. U.V.: $\epsilon_{208}=4950$.

Example X 1.0 g. of ($\Delta^{1'}$-pyrazolino)-4',3':16,17-($\Delta^5$-pregnene-3$\beta$-ol-20-one-acetate) are added in small portions under stirring to 21 cc. of acetone which contains 0.42 cc. of 70% perchloric acid, and 1 to 50° C. This results in a strong development of gas. After a total of 5 minutes the reaction mixture is poured into water, the white precipitate is filtered off under suction and dried. Recrystallization of the thus obtained crude product from methanol is 420 mg. of 16,17-methylene-pregnenolone-acetate having a melting point of 186–191° C. Repeated recrystallization gives 360 mg. of the compound having a melting point of 190.5–193° C. Further purification results in the compound having a melting point of 193–195° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

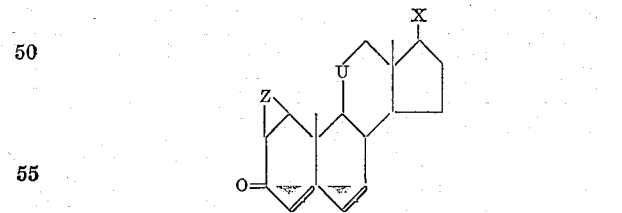

wherein U is selected from the group consisting of

—$CH_2$— and —CH($\beta$OH)

wherein X is selected from the group consisting of

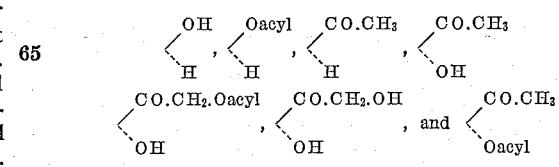

wherein acyl is derived from a lower hydrocarbon aliphatic carbocyclic acid; wherein Z is selected from the group consisting of —$CH_2$— and —$CH_2$—N=N; and wherein $x$ is selected from the group consisting of a single bond and a double bond, and wherein $y$ is a single bond when x is a single bond and is selected from the group consisting of a single bond and a double bond when x is a double bond.

2. 1,2 - diazomethylene - Δ⁴,⁶-androstadiene-17β-ol-3-one-17-acetate.

3. 1,2 - methylene - Δ⁴,⁶-androstadiene-17β-ol-3-one-17 acetate.

4. 1,3 - methylene - Δ⁴ - androstene-17β-ol-3-one-17-acetate.

5. 1,2 - diazomethylene - Δ⁴,⁶ - pregnadiene - 17α-ol-3,20-dione-17-acetate.

6. 1,2 - methylene-Δ⁴,⁶-pregnadiene-17α-ol-3,20-dione-17-acetate.

7. 1,2 - methylene - Δ⁴,⁶-pregnadiene-17α,21-diol-3,20-dione.

8. The 21-acetate of 1,2-methylene-Δ⁴,⁶-pregnadiene-17α,21-diol-3,20-dione.

9. 1,2 - methylene-Δ⁴,⁶-pregnadiene-17α-ol-3,20-dione.

10. 1,2 - methylene-Δ⁴,⁶-pregnadiene-11β,17α,21-triol-3,20-dione.

11. The 21-acetate of 1,2-methylene-Δ⁴,⁶-pregnadiene-11β,17α,21-triol-3,20-dione.

12. In a method of producing a compound of the formula:

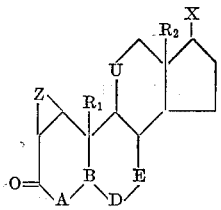

wherein $R_1$ is methyl; wherein $R_2$ is methyl; wherein U is selected from the group consisting of —CH₂— and —CH(βOH) wherein X is selected from the group consisting of

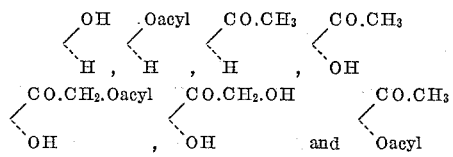

wherein acyl is derived from a lower hydrocarbon aliphatic carboxylic acid, wherein Z is selected from the group consisting of —CH₂— and —CH₂—N=N—, and wherein

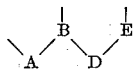

is selected from the group consisting of

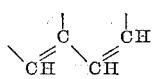

and

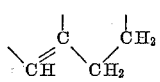

the step of reacting a compound of the formula:

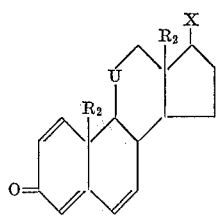

wherein $R_1$, $R_2$, U and X have the same definitions as above with diazomethane whereby the diazomethane adds on to the Δ¹-double bond of said compound to form the corresponding 1,2-diazomethylene derivatives thereof.

13. In a method of producing a compound of the formula:

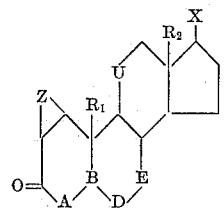

wherein $R_1$ is methyl, wherein $R_2$ is methyl, wherein U is selected from the group consisting of —CH₂— and —CH(βOH), wherein X is selected from the group consisting of

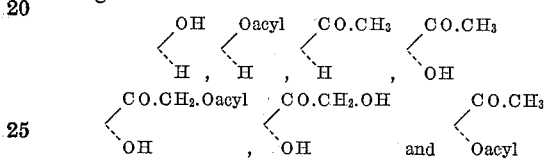

wherein acyl is derived from a lower hydrocarbon aliphatic carboxylic acid, wherein Z is selected from the group consisting of —CH₂— and —CH₂—N=N—, and wherein

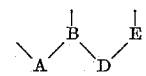

is selected from the group consisting of

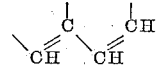

and

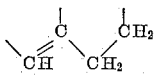

the steps of reacting a compound of the formula:

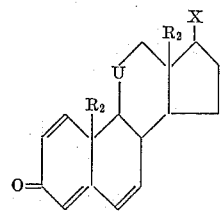

wherein $R_1$, $R_2$, U and X have the same definitions as above with diazomethane whereby the diazomethane adds on to the Δ¹-double bond of said compound to form the corresponding 1,2-diazomethylene derivative thereof; and splitting-off the nitrogen from said 1,2-diazomethylene derivative, thereby forming the corresponding 1,2-methylene derivative.

14. In a method of producing a compound of the formula:

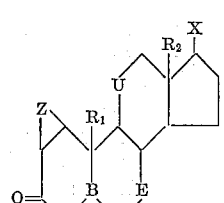

wherein $R_1$ is methyl, wherein $R_2$ is methyl, wherein U is selected from the group consisting of —CH₂—, and —CH(βOH), wherein X is selected from the group consisting of $$\underset{H}{\overset{OH}{\diagdown\diagup}}, \underset{H}{\overset{Oacyl}{\diagdown\diagup}}, \underset{H}{\overset{CO.CH_3}{\diagdown\diagup}}, \underset{OH}{\overset{CO.CH_3}{\diagdown\diagup}}$$

$$\underset{OH}{\overset{CO.CH_2.Oacyl}{\diagdown\diagup}}, \underset{OH}{\overset{CO.CH_2OH}{\diagdown\diagup}} \text{ and } \underset{Oacyl}{\overset{CO.CH_3}{\diagdown\diagup}}$$

wherein acyl is derived from a lower hydrocarbon aliphatic carboxylic acid, wherein Z is selected from the group consisting of —CH$_2$— and —CH$_2$—N≡N—, and wherein $$\diagdown\underset{A}{\overset{B}{\diagup}}\underset{D}{\overset{E}{\diagdown}}\diagup$$

is selected from the group consisting of $$\diagdown\underset{CH}{\overset{C}{=}}\underset{CH}{\overset{CH}{=}}\diagup$$

and $$\diagdown\underset{CH}{\overset{C}{=}}\underset{CH_2}{\overset{CH_2}{\diagdown}}\diagup$$

the steps of reacting a compound of the formula:

[structure]

wherein R$_1$, R$_2$, U and X have the same definitions as above with diazomethane whereby the diazomethane adds on to the Δ$^1$-double bond of said compound to form the corresponding 1,2-diazomethylene derivative thereof; splitting-off the nitrogen from said 1,2-diazomethylene derivative, thereby forming the corresponding 1,2-methylene derivative; and selectively hydrogenating the Δ$^6$-double bond of said 1,2-methylene derivative thereby forming the corresponding 1,2-methylene-Δ$^4$-compound.

15. In a method of producing a compound of the formula:

[structure]

wherein R$_1$ is methyl, wherein R$_2$ is methyl, wherein U is selected from the group consisting of —CH$_2$— and —CH(βOH), wherein X is selected from the group consisting of $$\underset{H}{\overset{OH}{\diagdown\diagup}}, \underset{H}{\overset{Oacyl}{\diagdown\diagup}}, \underset{H}{\overset{CO.CH_3}{\diagdown\diagup}}, \underset{OH}{\overset{CO.CH_3}{\diagdown\diagup}}$$

$$\underset{OH}{\overset{CO.CH_2.Oacyl}{\diagdown\diagup}}, \underset{OH}{\overset{CH.CH_2OH}{\diagdown\diagup}} \text{ and } \underset{Oacyl}{\overset{CO.CH_3}{\diagdown\diagup}}$$

wherein acyl is derived from a lower hydrocarbon aliphatic carboxylic acid, wherein Z is selected from the group consisting of —CH$_2$— and —CH$_2$—N≡N—, and wherein $$\diagdown\underset{A}{\overset{B}{\diagup}}\underset{D}{\overset{E}{\diagdown}}\diagup$$

is selected from the group consisting of $$\diagdown\underset{CH}{\overset{C}{=}}\underset{CH}{\overset{CH}{=}}\diagup$$

and $$\diagdown\underset{CH}{\overset{C}{=}}\underset{CH_2}{\overset{CH_2}{\diagdown}}\diagup$$

the steps of reacting a compound of the formula:

[structure]

wherein R$_1$, R$_2$, U and X have the same definitions as above with diazomethane whereby the diazomethane adds on to the Δ$^1$-double bond of said compound to form the corresponding 1,2-diazomethylene derivative thereof; and heating said 1,2-diazomethylene derivative to a temperature sufficiently high to split-off the nitrogen therefrom, thereby forming the corresponding 1,2-methylene derivative.

16. In a method of producing a compound of the formula:

[structure]

wherein R$_1$ is methyl, wherein R$_2$ is methyl, wherein U is selected from the group consisting of —CH$_2$— and —CH(βOH), wherein X is selected from the group consisting of $$\underset{H}{\overset{OH}{\diagdown\diagup}}, \underset{H}{\overset{Oacyl}{\diagdown\diagup}}, \underset{H}{\overset{CO.CH_3}{\diagdown\diagup}}, \underset{OH}{\overset{CO.CH_3}{\diagdown\diagup}}$$

$$\underset{OH}{\overset{CO.CH.Oacyl}{\diagdown\diagup}}, \underset{OH}{\overset{CO.CH_2.OH}{\diagdown\diagup}} \text{ and } \underset{Oacyl}{\overset{CO.CH_3}{\diagdown\diagup}}$$

wherein acyl is derived from a lower hydrocarbon aliphatic carboxylic acid, wherein Z is selected from the group consisting of —CH$_2$— and —CH$_2$—N≡N—, and wherein $$\diagdown\underset{A}{\overset{B}{\diagup}}\underset{D}{\overset{E}{\diagdown}}\diagup$$

is selected from the group consisting of $$\diagdown\underset{CH}{\overset{C}{=}}\underset{CH}{\overset{CH}{=}}\diagup$$

and $$\diagdown\underset{CH}{\overset{C}{=}}\underset{CH_2}{\overset{CH_2}{\diagdown}}\diagup$$

the step of reacting a compound of the formula:

[structure]

wherein $R_1$, $R_2$, U and X have the same definitions as above with diazomethane at a temperature of 0–30° C. whereby the diazomethane adds on to the $\Delta^1$-double bond of said compound to form the corresponding 1,2-diazomethylene derivative thereof.

17. In a method of producing a compound of the formula:

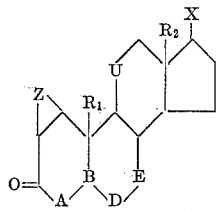

wherein $R_1$ is methyl, wherein $R_2$ is methyl, wherein U is selected from the group consisting of —$CH_2$— and —CH($\beta$OH) wherein X is selected from the group consisting of

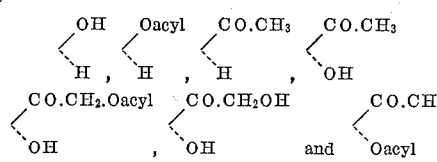

wherein acyl is derived from a lower hydrocarbon aliphatic carboxylic acid, wherein Z is selected from the group consisting of —$CH_2$— and —$CH_2$—N=N—, and wherein

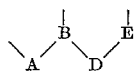

is selected from the group consisting of

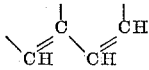

and

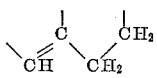

the steps of reacting a compound of the formula:

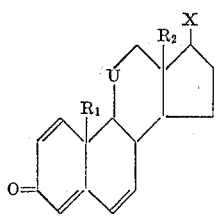

wherein $R_1$, $R_2$, U and X have the same definitions as above with diazomethane whereby the diazomethane adds on to the $\Delta^1$-double bond of said compound to form the corresponding 1,2-diazomethylene derivative thereof; and heating said 1,2-diazomethylene derivative under vacuum at approximately the melting point of said derivative so as to split-off the nitrogen therefrom, thereby forming the corresponding 1,2-methylene derivative.

18. In a method of producing a compound of the formula:

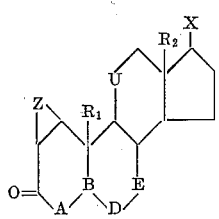

wherein $R_1$ is methyl, wherein $R_2$ is methyl, wherein U is selected from the group consisting of —$CH_2$— and —CH($\beta$OH) wherein X is selected from the group consisting of

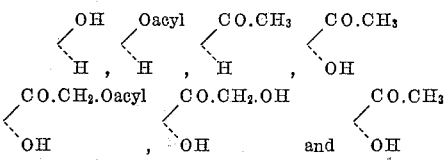

wherein acyl is derived from a lower hydrocarbon aliphatic carboxylic acid, wherein Z is selected from the group consisting of —$CH_2$— and —$CH_2$—N=N—, and wherein

is selected from the group consisting of

and

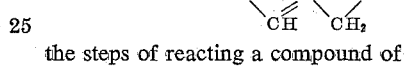

the steps of reacting a compound of the formula:

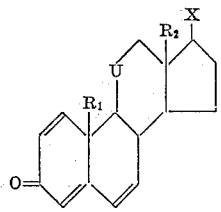

wherein $R_1$, $R_2$, U and X have the same definitions as above with diazomethane whereby the diazomethane adds on to the $\Delta^1$-double bond of said compound to form the corresponding 1,2-diazomethylene derivative thereof; and treating the thus formed 1,2-diazomethylene derivative with an acid catalyst selected from the group consisting of perchloric acid, concentrated hydrochloric acid, trifluoracetic acid, boron trifluoride, boron trifluoride etherate and fluoboric acid so as to split-off the nitrogen from said derivative and form the corresponding 1,2-methylene derivative.

19. In a method of producing a compound of the formula:

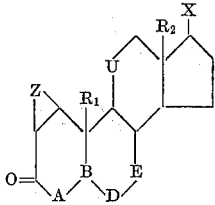

wherein $R_1$ is methyl, wherein $R_2$ is methyl, wherein U is selected from the group consisting of —$CH_2$— and —CH($\beta$OH), wherein X is selected from the group consisting of

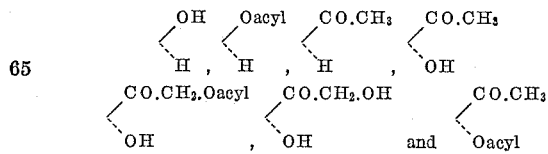

wherein acyl is derived from a lower hydrocarbon aliphatic carboxylic acid, wherein Z is selected from the group consisting of —$CH_2$— and —$CH_2$—N=N—, and wherein

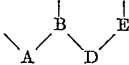

is selected from the group consisting of

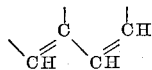

and

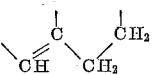

the steps of reacting a compound of the formula:

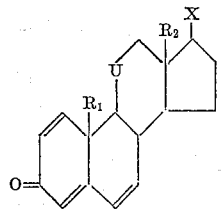

wherein $R_1$, $R_2$, U and X have the same definitions as above with diazomethane whereby the diazomethane adds on to the $\Delta^1$-double bond of said compound to form the corresponding 1,2-diazomethylene derivative thereof; and treating the thus formed 1,2-diazomethylene derivative with an acid catalyst selected from the group consisting of perchloric acid, concentrated hydrochloric acid, trifluoroacetic acid, boron trifluoride, boron trifluoride etherate and fluoboric acid at a temperature of 0–50° C. so as to split-off the nitrogen from said derivative and form the corresponding 1,2-methylene derivative.

20. In a method of producing a compound of the formula:

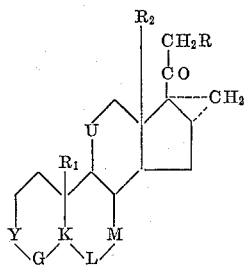

wherein R is hydrogen, wherein $R_1$ is methyl, wherein $R_2$ is methyl, wherein U is —$CH_2$, wherein Y is selected grom the group consisting of $CH(\beta OH)$ and —$CH(\beta Oacyl)$ wherein acyl is derived from a lower hydrocarbon aliphatic carboxylic acid, and wherein

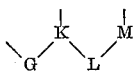

is

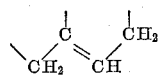

the step of treating 16,17-diazomethylene-20-ketosteroid of the formula:

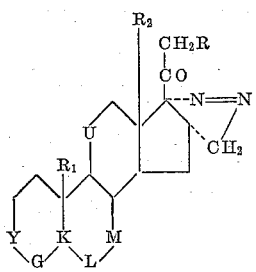

wherein R, $R_1$, $R_2$, U, Y and —G—K—L—M have the same definitions as above with an acid catalyst so as to split-off the nitrogen therefrom, thereby forming the corresponding 16,17-methylene-20-steroid.

21. In a method of producing a compound of the formula:

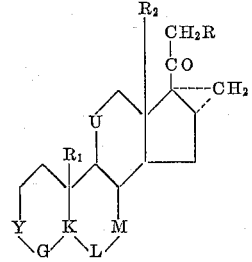

wherein R is hydrogen, wherein $R_1$ is methyl, wherein $R_2$ is methyl, wherein U is —$CH_2$, wherein Y is selected from the group consisting of —$CH(\beta OH)$ and —$CH(\beta Oacyl)$ wherein acyl is derived from a lower hydrocarbon aliphatic carboxylic acid, and wherein

is

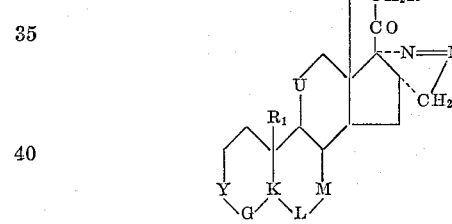

the step of treating 16,17-diazomethylene-20-ketosteroid of the formula:

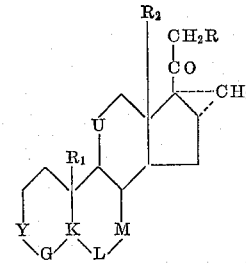

wherein R, $R_1$, $R_2$, U, Y and —G—K—L—M have the same definitions as above with an acid catalyst selected from the group consisting of perchloric acid, concentrated hydrochloric acid, trifluoroacetic acid, boron trifluoride, boron trifluoride etherate and fluoboroic acid so as to split-off the nitrogen therefrom, thereby forming the corresponding 16,17-methylene-20-steroid.

22. In a method of producing a compound of the formula:

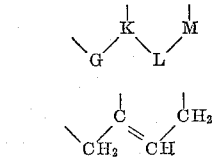

wherein R is hydrogen, wherein $R_1$ is methyl, wherein $R_2$ is methyl, wherein U is —$CH_2$, wherein Y is selected from the group consisting of —$CH(\beta OH)$ and —$CH(\beta Oacyl)$ wherein acyl is derived from a lower hydrocarbon aliphatic carboxylic acid, and wherein the step of treating 16,17-diazomethylene-20-ketosteroid of the formula:

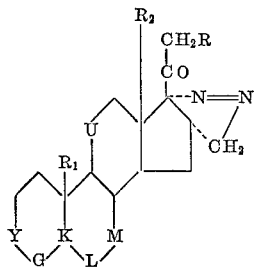

wherein R, $R_1$, $R_2$, U, Y and —G—K—L—M have the same definitions as above with an acid catalyst selected from the group consisting of perchloric acid, concentrated hydrochloric acid, trifluoroacetic acid, boron trifluoride, boron trifluoride etherate and fluoboric acid at a temperature of 0–50° C. so as to split-off the nitrogen therefrom, thereby forming the corresponding 16,17-methylene-20-steroid.

References Cited in the file of this patent
Sandoval et al.: J.A.C.S. (1951), vol. 73, pages 2383–4 relied on.

UNITED STATES PATENT OFFICE
CERTIFICATE OF CORRECTION

Patent No. 3,127,396            March 31, 1964

Rudolf Wiechert et al.

It is hereby certified that error appears in the above numbered patent requiring correction and that the said Letters Patent should read as corrected below.

Column 9, line 8, for "1,3" read -- 1,2 --.

Signed and sealed this 8th day of September 1964.

(SEAL)
Attest:

ERNEST W. SWIDER            EDWARD J. BRENNER
Attesting Officer            Commissioner of Patents